United States Patent
Moon et al.

(10) Patent No.: US 12,038,593 B2
(45) Date of Patent: *Jul. 16, 2024

(54) NEAR-INFRARED RAY ABSORBING ARTICLE AND AN OPTICAL APPARATUS COMPRISING THE SAME

(71) Applicant: LMS CO., LTD., Pyeongtaek-si (KR)

(72) Inventors: Sung Hwan Moon, Pyeongtaek-si (KR); Seon Ho Yang, Pyeongtaek-si (KR); Choon Woo Ji, Pyeongtaek-si (KR); Nam Woo Kang, Pyeongtaek-si (KR); Joon Ho Jung, Pyeongtaek-si (KR); Bo Chul Kang, Pyeongtaek-si (KR); Hee Kyeong Kim, Pyeongtaek-si (KR); Jeong Og Choi, Pyeongtaek-si (KR); Seong Yong Yoon, Pyeongtaek-si (KR)

(73) Assignee: LMS CO., LTD., Pyeongtaek-si (KR)

( * ) Notice: Subject to any disclaimer, the term of this patent is extended or adjusted under 35 U.S.C. 154(b) by 877 days.

This patent is subject to a terminal disclaimer.

(21) Appl. No.: 17/108,336

(22) Filed: Dec. 1, 2020

(65) Prior Publication Data

US 2021/0382213 A1     Dec. 9, 2021

(30) Foreign Application Priority Data

Jun. 5, 2020   (KR) .................. 10-2020-0068228
Nov. 6, 2020   (KR) .................. 10-2020-0147696

(51) Int. Cl.
*G02B 5/00* (2006.01)
*C09B 57/00* (2006.01)
(Continued)

(52) U.S. Cl.
CPC ................ *G02B 5/22* (2013.01); *C09B 57/00* (2013.01); *C09B 57/007* (2013.01);
(Continued)

(58) Field of Classification Search
CPC .......... G02B 5/003; G02B 5/22; G02B 5/208; C09B 57/00; C09B 57/007; C09B 67/0063

See application file for complete search history.

(56) References Cited

U.S. PATENT DOCUMENTS

2010/0035034 A1   2/2010  Yin
2014/0130794 A1   5/2014  Antonaia et al.
(Continued)

FOREIGN PATENT DOCUMENTS

CN    101389783 A    3/2009
CN    103782113 A    5/2014
(Continued)

OTHER PUBLICATIONS

Chinese Office Action issued on Jul. 28, 2022, in connection with the Chinese Patent Application No. 202011373793.3.
(Continued)

*Primary Examiner* — Bijan Ahvazi
(74) *Attorney, Agent, or Firm* — Hauptman Ham, LLP

(57) ABSTRACT

Provided is a near-infrared ray absorbing article. A near-infrared ray absorbing article of the present invention is capable of preventing a decrease in visible transmittance and near-infrared absorption due to the interaction between a plurality of organic materials forming light-absorbing layers. In addition, the near-infrared ray absorbing article of the present invention has the advantage of being able to be thinner. In addition, the near-infrared ray absorbing article of the present invention has the advantage of excellent mechanical properties such as strength and heat resistance.

16 Claims, 7 Drawing Sheets

(51) Int. Cl.
*C09B 67/20* (2006.01)
*G02B 5/20* (2006.01)
*G02B 5/22* (2006.01)

(52) U.S. Cl.
CPC .......... *C09B 67/0063* (2013.01); *G02B 5/003* (2013.01); *G02B 5/208* (2013.01)

(56) References Cited

U.S. PATENT DOCUMENTS

| | | | | |
|---|---|---|---|---|
| 2016/0318796 | A1* | 11/2016 | Masuda | .................. C03C 17/32 |
| 2018/0188428 | A1* | 7/2018 | Arimura | ................ G02B 5/223 |
| 2020/0072741 | A1 | 3/2020 | Choi et al. | |
| 2020/0241185 | A1* | 7/2020 | Choi | .................... C08K 5/3417 |
| 2021/0191013 | A1* | 6/2021 | Moon | ...................... C08K 5/29 |

FOREIGN PATENT DOCUMENTS

| | | | |
|---|---|---|---|
| CN | 208722481 U | 4/2019 | |
| CN | 110194589 A | 9/2019 | |
| CN | 110462462 A | 11/2019 | |
| JP | 2007-256758 A | 10/2007 | |
| JP | 2007256758 A * | 10/2007 | ............... C09K 3/00 |
| JP | 6595610 B2 | 10/2019 | |
| KR | 10-2009-0051250 A | 5/2009 | |
| KR | 10-2018-0101761 A | 9/2018 | |
| KR | 20180101761 A * | 9/2018 | ............... C08J 7/04 |
| KR | 10-1931731 B1 | 12/2018 | |
| WO | 2015/080043 A1 | 6/2015 | |

OTHER PUBLICATIONS

Korean Office Action issued on May 12, 2022, in connection with the Korean Patent Application No. 10-2020-0147696.

* cited by examiner

NEAR-INFRARED RAY ABSORBING ARTICLE AND AN OPTICAL APPARATUS COMPRISING THE SAME

CROSS-REFERENCE TO RELATED APPLICATION

This application claims priority to and the benefit of Korean Patent Application Nos. 10-2020-0068228, filed on Jun. 5, 2020, and 10-2020-0147696, filed on Nov. 6, 2020, the disclosure of which is incorporated herein by reference in its entireties.

BACKGROUND

1. Field of the Invention

The present invention relates to a near-infrared ray absorbing article, an optical filter including the same, and an imaging device including the same.

2. Discussion of Related Art

The demand for digital camera modules using image sensors is increasing significantly due to the recent expansion of the spread of smart phones and tablet PCs. The digital camera modules used in these mobile devices are evolving toward a smaller thickness and higher definition.

In digital cameras, video signals are received through image sensors. Unlike the human eye, image sensors made of semiconductors also respond to wavelengths in the (near-) infrared region. Therefore, in order to obtain image information similar to what the human eye sees, an infrared cut-off filter (IRCF) which blocks light having a wavelength in the (near-)infrared region is required.

As one example of an IRCF, i) a reflection-type filter which is manufactured by depositing a multilayer dielectric film on a glass substrate and reflects infrared rays to only transmit light having a wavelength in the visible region was considered. However, since the reflection-type filter cannot absorb light having a wavelength in the near-infrared region, internal reflection is severe inside the camera module. The internal reflection is a main cause of an image ghosting phenomenon (a phenomenon in which a developed image is perceived as blurry or an image that does not exist in reality is perceived).

As another example of an IRCF, ii) an inorganic absorbing-type filter (hereinafter also referred to as "blue filter") which is manufactured by depositing a multilayer dielectric film on a glass substrate (also known as "blue glass") exhibiting a blue color due to dispersion of inorganic material particles and absorbs and reflects light in the near-infrared region was considered. The blue filter is useful in suppressing the above-described ghosting phenomenon by absorbing near-infrared rays. However, since the blue filter has high brittleness and thus does not meet the recent technology trend of reducing the total thickness of an IRCF to 0.2 mm or less.

As still another example of an IRCF, iii) an organic absorbing-type filter in which a transparent substrate and a plurality of organic materials (light absorbers) having absorption maxima in different wavelength ranges are used and which is manufactured by depositing a multilayer dielectric film and is capable of absorbing and reflecting near-infrared rays was considered. In the organic absorbing-type filter, since the wavelength of light that can be absorbed by the filter can be controlled relatively freely as compared to in the inorganic absorbing-type filter, the organic absorbing-type filter is advantageous for increasing the absorption of light in the infrared region and reducing the absorption of light in the visible wavelength region. In addition, since a light-absorbing layer in which light absorbers are used is separately applied to the organic absorbing-type filter, there is no restriction in selecting a substrate (or base board), and there is an advantage in that a substrate having high strength can be freely selected. However, the organic absorbing-type filter has problems such as a decrease in visible transmittance and a decrease in near-infrared absorption due to the interaction occurring between the organic materials in the light-absorbing layers.

Therefore, there is a need to develop an IRCF capable of preventing a decrease in visible transmittance and near-infrared absorption due to the interactions between the organic materials forming the light-absorbing layer.

Related-Art Document

Patent Document (Patent Document 1) Korean Laid-Open Patent Application No. 10-2009-0051250

SUMMARY OF THE INVENTION

The present invention is directed to providing a near-infrared ray absorbing article capable of preventing a decrease in visible transmittance and (near-)infrared absorption due to the interactions between a plurality of organic materials constituting a light-absorbing layer.

One aspect of the present invention provides a near-infrared ray absorbing article.

A near-infrared ray absorbing article of the present invention includes at least a glass substrate and a plurality of light-absorbing layers having different optical properties. In addition, the plurality of light-absorbing layers are separated from each other.

In the above, the statement that the light-absorbing layer are "separated from each other" means that the light-absorbing layers are disposed so that no interaction occurs between light absorbers used in the light-absorbing layers. For example, when the near-infrared ray absorbing article of the present invention includes a glass substrate, a first light-absorbing layer, and a second light-absorbing layer and it is stated that the light-absorbing layers are separated from each other, this may mean that the absorbing article has a laminated structure of first light-absorbing layer (second light-absorbing layer)/glass substrate/second light-absorbing layer (first light-absorbing layer) or a structure of glass substrate/first light-absorbing layer (second light-absorbing layer)/second light-absorbing layer (first light-absorbing layer) and is configured so that the light absorbers used in the first and second light-absorbing layers do not interact or mix with each other.

As described above, the plurality of light-absorbing layers used in the near-infrared ray absorbing article of the present invention have different optical properties or differ in the form in which constituents thereof are present. That is, the near-infrared ray absorbing article of the present invention includes at least the glass substrate, the first light-absorbing layer, and the second light-absorbing layer. In addition, the first light-absorbing layer and the second light-absorbing layer have different optical properties or differ in the form in which constituents thereof are present. In addition, the first light-absorbing layer and the second light-absorbing layer are physically separated from each other and are present as separate (or independent) layers.

The first light-absorbing layer and the second light-absorbing layer used in the near-infrared ray absorbing article of the present invention have different optical properties. Specifically, the first light-absorbing layer and the second light-absorbing layer have absorption maxima in different wavelength ranges. Specifically, the first light-absorbing layer has an absorption maximum in the wavelength range of 850 nm to 1,200 nm, and the second light-absorbing layer has an absorption maximum in the wavelength range of 650 nm to 750 nm. That is, a maximum absorption wavelength of the first light-absorbing layer is in the range of 850 nm to 1,200 nm. The maximum absorption wavelength of the second light-absorbing layer is in the range of 650 nm to 750 nm.

In the above, the statement that a specific layer or member has an absorption maximum in a specific wavelength range means that the specific layer or member has a maximum absorption wavelength in the wavelength range. In addition, when it is stated that a specific layer or member has a maximum absorption wavelength in a specific wavelength range, this means that minimum transmittance is exhibited in the wavelength range.

In addition, the maximum absorption wavelength of the light-absorbing layer may be measured for the light-absorbing layer itself or for a laminate formed of the light-absorbing layer and the glass substrate. The measurement of the maximum absorption wavelength of the light-absorbing layer may be carried out by the method to be described below in Examples.

In addition, the maximum absorption wavelength of the light-absorbing layer may be controlled by controlling the light absorber used therein and the types and relative amounts of components of a composition for forming the light-absorbing layer, and this method of controlling the maximum absorption wavelength of the light-absorbing layer will be described in detail below.

In the present invention, since a plurality of light-absorbing layers having different maximum absorption wavelengths are used and the light-absorbing layers are configured to be separated from each other, the interaction between light absorbers forming the light-absorbing layers can be prevented, and as a result, a decrease in visible transmittance and near-infrared (or infrared) absorption due to the interaction can be prevented. In addition, since the light-absorbing layers are disposed in the manner as described above, the degradation of properties due to the above-described interaction between the light absorbers can be prevented, and at the same time, the near-infrared ray absorbing article of the present invention can have so-called optically clear characteristics. Therefore, the near-infrared ray absorbing article of the present invention may have a haze of 0.3% or less due to the above-described disposition of the light-absorbing layers.

In one example, the haze of the near-infrared ray absorbing article may be 0.25% or less or 0.2% or less. The lower limit is not particularly limited because it is better as the lower limit is lower, and for example, the haze may be 0.001% or more, 0.01% or more, or 0.05% or more. As the measurement standard of the haze, a known measurement standard such as the ASTM D1003 standard may be applied. The reference wavelength for the haze may be, for example, 550 nm.

In one example, the transmittance characteristics of the first light-absorbing layer forming the near-infrared ray absorbing article may be additionally controlled. Specifically, the first light-absorbing layer may have a light transmittance of 20% or less for any one wavelength in the wavelength range of 950 nm to 1,200 nm.

In another example, the reference wavelength for the transmittance of the first light-absorbing layer may be 960 nm or more, 970 nm or more, 980 nm or more, 990 nm or more, or 1,000 nm or more, and 1,190 nm or less, 1,180 nm or less, 1,170 nm or less, 1,160 nm or less, 1,150 nm or less, 1,140 nm or less, 1,130 nm or less, 1,120 nm or less, 1,110 nm or less, 1,100 nm or less, 1,090 nm or less, 1,080 nm or less, 1,070 nm or less, 1,060 nm or less, or 1,050 nm or less.

In another example, the transmittance of the first light-absorbing layer may be 19% or less, 18% or less, 17% or less, 16% or less, or 15% or less. Although the lower limit is not particularly limited because lower limits mean higher absorption, the transmittance may be 0.01% or more, 0.1% or more, 1% or more, 5% or more, or 10% or more. A method by which such transmittance can be attained will be described below.

In one example, the transmittance characteristics of the second light-absorbing layer forming the near-infrared ray absorbing article may be additionally controlled. Specifically, the second light-absorbing layer may have a light transmittance of 5% or less for any one wavelength in the wavelength range of 670 nm to 730 nm.

In another example, the reference wavelength for the transmittance of the second light-absorbing layer may be 675 nm or more, 680 nm or more, 685 nm or more, 690 nm or more, or 695 nm or more, and 725 nm or less, 720 nm or less, 715 nm or less, 710 nm or less, 705 nm or less, or 700 nm or less.

In another example, the transmittance of the second light-absorbing layer may be 4.5% or less, 3% or less, 3.5% or less, 3% or less, 2.5% or less, or 2% or less. Although the lower limit is not particularly limited because lower limits mean higher absorption, the transmittance may be 0.01% or more, 0.1% or more, 0.5% or more, or 1% or more.

Since the near-infrared ray absorbing article of the present invention includes at least the plurality of light-absorbing layers (first and second light-absorbing layers) satisfying the above-described properties, unique optical properties such as specific transmittance can be exhibited.

In one example, the near-infrared ray absorbing article may have a light transmittance of 60% or more for a wavelength of 450 nm. In another example, the light transmittance of the near-infrared ray absorbing article for a wavelength of 450 nm may be 65% or more or 70% or more. Although the upper limit is not particularly limited because it is better as the upper limit is higher, the transmittance may be about 100%, 95% or less, 90% or less, 85% or less, or 80% or less.

In one example, the near-infrared ray absorbing article may have a light transmittance of 70% or more for a wavelength of 550 nm. In another example, the light transmittance of the near-infrared ray absorbing article for a wavelength of 550 nm may be 75% or more or 80% or more. Although the upper limit is not particularly limited because it is better as the upper limit is higher, the transmittance may be about 100%, 95% or less, or 90% or less.

In one example, the near-infrared ray absorbing article may have a light transmittance of 40% or less for a wavelength of 1,050 nm. In another example, the light transmittance for a wavelength of 1,050 nm may be 37% or less, 35% or less, 33% or less, or 30% or less. Although the lower limit is not particularly limited because it is better as the lower limit is lower, the transmittance may be 1% or more, 5% or more, 10% or more, 15% or more, or 20% or more.

The light transmittance of the near-infrared ray absorbing article and the like may be values measured for the near-infrared ray absorbing article using a known spectrophotometer.

In the interest of securing appropriate mechanical properties such as strength, the near-infrared ray absorbing article of the present invention includes a glass substrate as a substrate for supporting the first light-absorbing layer and the second light-absorbing layer.

In the interest of improving mechanical properties of the near-infrared ray absorbing article of the present invention, a glass substrate particularly having high strength, such as a tempered glass substrate, may be used as a glass substrate in the near-infrared ray absorbing article. Specifically, the glass substrate used in the near-infrared ray absorbing article of the present invention may have a three-point flexural strength of 360 MPa or more as measured in accordance with the ASTM D790 standard. In another example, the three-point flexural strength may be 370 MPa or more, 380 MPa or more, 390 MPa or more, 400 MPa or more, 410 MPa or more, 420 MPa or more, 430 MPa or more, 440 MPa or more, 450 MPa or more, 460 MPa or more, 470 MPa or more, 480 MPa or more, 490 MPa or more, or 500 MPa or more.

The type of glass substrate that can be used as the tempered glass substrate in the present invention is not particularly limited as long as it satisfies the above-described flexural strength, and for example, physically strengthened tempered glass or chemically strengthened tempered glass may be used, and chemically strengthened tempered glass is preferably used.

In one example, the tempered glass substrate may be a tempered glass substrate which includes a first compressive stress layer on a first main surface of the glass substrate and a second compressive stress layer on a second main surface, that is, a main surface opposite the first main surface. Since a glass substrate (chemically) strengthened by these compressive stress layers is used, the near-infrared ray absorbing article of the present invention can have improved strength. In addition, the high weather resistance of an imaging device in which the near-infrared ray absorbing article or an optical filter having the near-infrared ray absorbing article is used can be secured.

A method of forming the compressive stress layers on the glass substrate is not particularly limited, and any known method of physically strengthening or chemically strengthening a glass substrate may be used. However, in the interest of minimizing the damage to a glass substrate, the compressive stress layers may be formed by a chemical strengthening method. The above-described compressive stress layer may refer to a portion in which $Na^+$ ions of the original glass substrate containing $Na^+$ ions are replaced with $K^+$ ions. In the process of replacing the $Na^+$ ions with $K^+$ ions, the layer corresponding to a portion starting from one surface of the glass substrate and substituted with the $K^+$ ions is defined as the compressive stress layer. In general, the compressive stress layer is known as a depth of compressive stress layer (DOL). That is, since the compressive stress layer is formed when a component of the glass substrate is replaced with another component by an external treatment (e.g., heat treatment, etc.), the compressive stress layer may be formed toward the inside of the glass substrate (this is in the same context as referring to the compressive stress layer as a DOL).

In the near-infrared ray absorbing article of the present invention, the thickness of each of the first compressive stress layer and the second compressive stress layer that the tempered glass substrate includes may be 30% of the total thickness of the near-infrared ray absorbing article or less. Specifically, the thickness of each of the first compressive stress layer and the second compressive stress layer may be in the range of 1 μm to 30 μm. In another example, the thickness may be 5 μm or more, 10 μm or more, or 15 μm or more, and 25 μm or less or 20 μm or less. Since a tempered glass substrate including compressive stress layers formed to a thickness satisfying this range is used in the near-infrared ray absorbing article of the present invention, a near-infrared ray absorbing article having excellent strength while having a small thickness can be implemented.

When the compressive stress layer does not have a uniform thickness throughout, a maximum thickness, a minimum thickness, or an average of the maximum and minimum thicknesses of the compressive stress layer may be referred to as the thickness of the compressive stress layer.

In the near-infrared ray absorbing article of the present invention, in the interest of securing appropriate mechanical and physical properties of the near-infrared ray absorbing article, the thickness of the glass substrate may also be appropriately controlled. For example, the thickness of the glass substrate may be in the range of 0.07 mm to 0.3 mm. As described above, the thickness may refer to a maximum thickness, a minimum thickness, or an average of the maximum and minimum thicknesses of the glass substrate. In another example, the thickness may be in the range of 0.07 mm to 0.2 mm.

As described above, in the near-infrared ray absorbing article of the present invention, in the interest of securing appropriate optical properties (e.g., improved light transmittance in the visible region and improved absorption of light in the near-infrared region) of the near-infrared ray absorbing article, the first light-absorbing layer and the second light-absorbing layer are configured as independent layers.

As in the above, when it is stated that the first light-absorbing layer and the second light-absorbing layer are configured as layers which are independent of each other or separated from each other, this may mean that, for example, the first light-absorbing layer and the second light-absorbing layer are configured so that they are not in physical contact with each other or constituents thereof are not mixed.

It is known that there are various ways of disposing the first light-absorbing layer and the second light-absorbing layer so that they are separated from each other. For example, in the near-infrared ray absorbing article of the present invention, the first light-absorbing layer is disposed so that it is present on one surface of the glass substrate, and the second light-absorbing layer is disposed so that it is present on the other surface of the glass substrate, and therefore, the first light-absorbing layer and the second light-absorbing layer may be disposed so that they are present while being separated from each other. That is, in the near-infrared ray absorbing article of the present invention, the first light-absorbing layer may be provided on one surface of the glass substrate, and the second light-absorbing layer may be provided on the other surface of the glass substrate. In other words, in the near-infrared ray absorbing article, the first light-absorbing layer may be provided on an opposite side of the second light-absorbing layer based on the glass substrate.

In another example, the first light-absorbing layer and the second light-absorbing layer may be sequentially laminated on one surface of the glass substrate while being separated from each other as described above. In this case, in the near-infrared ray absorbing article, the glass substrate, the first light-absorbing layer, and the second light-absorbing layer may be present in the order as written, or the glass substrate, the second light-absorbing layer, and the first light-absorbing layer may be present in the order as written.

FIGS. 1 and 2 illustrate such laminated structures. A near-infrared ray absorbing article of the present invention may have a structure in which a first light-absorbing layer 200, a glass substrate 100, and a second light-absorbing layer 300 are present in the order as written (see FIG. 1) or may have a structure in which a second light-absorbing layer 300, a glass substrate 100, and a first light-absorbing layer 200 are present in the order as written (see FIG. 2).

In addition, as described above, the first light-absorbing layer and the second light-absorbing layer may be laminated on one surface of the glass substrate in the near-infrared ray absorbing article of the present invention. The near-infrared ray absorbing article may have, for example, a structure in which a glass substrate 100, a first light-absorbing layer 200, and a second light-absorbing layer 300 are present in the order as written (see FIG. 3) or may have a structure in which a glass substrate 100, a second light-absorbing layer 300, and a first light-absorbing layer 200 are present in the order as written (not shown). The near-infrared ray absorbing article preferably has a structure which includes the glass substrate 100, the first light-absorbing layer 200, and the second light-absorbing layer 300 in the order as written.

As will be described below, when the near-infrared ray absorbing article has a structure in which the first light-absorbing layer and the second light-absorbing layer are adjacent to each other (laminated structure of glass substrate/second light-absorbing layer/first light-absorbing layer or glass substrate/first light-absorbing layer/second light-absorbing layer), the laminated structure needs to be configured such that the first light-absorbing layer and the second light-absorbing layer are clearly separated from each other so that the light absorbers (or pigments) used in the light-absorbing layers are not mixed. This is because when the pigments used in the first and second light-absorbing layer are mixed, optical properties and the like may be degraded. As a method for configuring the near-infrared ray absorbing article so that the first and second light-absorbing layers are separated from each other, a separation layer 400 may be introduced between the first light-absorbing layer 200 and the second light-absorbing layer 300 (see FIG. 4).

The separation layer may refer to a known functional layer that functions to prevent the mixing of the constituents (e.g., light absorbers such as pigments) of the first and second light-absorbing layers. For example, as the separation layer, a known barrier film or the like may be used, and in another example, a known adhesive may be used.

In the interest of securing the desired optical properties of the near-infrared ray absorbing article of the present invention and securing appropriate adhesion between the light-absorbing layers, it may be advantageous to use an adhesive layer (or adhesive material layer) as the separation layer. As used herein, the term "adhesion," as it is known, may refer to a phenomenon in which two materials are brought into contact with each other and attached to each other through physical and/or chemical bonding, and the term "adhesive" may refer to a known chemical material manufactured so as to form a state in which the adhesive and a surface of an adherend are bonded by the bonding force at the interface.

In general, the adhesive layer may be formed by curing or crosslinking an adhesive composition including an adhesive resin and the like. In this case, the type of resin capable of forming the adhesive layer (adhesive material layer) is not particularly limited. As the resin, a resin may be freely selected from among the known adhesive resins within a range that ensures appropriate adhesion between the first light-absorbing layer and the second light-absorbing layer and used. For example, the resin used for the adhesive layer may be one or more selected from among a cyclic olefin-based resin, a polyacrylate-based resin, a polyisocyanate-based resin, a polyimide-based resin, a polyetherimide-based resin, a polyamideimide-based resin, an acrylic resin, a polycarbonate-based resin, and a polyethylene naphthalate-based resin.

In the above, in the interest of preventing the interaction (or mixing) between the pigments forming the first light-absorbing layer and the second light-absorbing layer and configuring the near-infrared ray absorbing article to exhibit optically clear characteristics, the thickness of the separation layer (adhesive layer or adhesive material layer) may also be appropriately controlled. The thickness of the separation layer may be 0.2 µm or more. In another example, the thickness may be 0.3 µm or more, 0.4 µm or more, or 0.5 µm or more. The upper limit is not particularly limited and can be appropriately controlled within a range that does not significantly affect the desired final thickness of the near-infrared ray absorbing article.

The thickness of the adhesive layer may be determined by a method of applying an adhesive composition capable of forming the adhesive layer and specifically by a method of forming a coating using the adhesive composition. For example, when a spin-coating method is used as the method of forming a coating using the adhesive composition, for the same coating time, the thickness of the adhesive layer may decrease as the number of rotations in the spin-coating increases.

The thickness of each of the light-absorbing layers is also not particularly limited and may be appropriately controlled within a range capable of forming an average near-infrared ray absorbing article thickness to be described below. The thickness of each of the first light-absorbing layer and the second light-absorbing layer may be, for example, in the range of 0.25 µm to 10 µm. In another example, the thickness may be 0.5 µm or more and 5 µm or less. The thickness of the first light-absorbing layer and the thickness of the second light-absorbing layer may be the same or different from each other.

In the present invention, when a specific member does not have a uniform thickness throughout, a maximum thickness, a minimum thickness, or an average of the maximum and minimum thicknesses of the member may be referred to as the thickness of the member.

Due to including the glass substrate and the first and second light-absorbing layers, the near-infrared ray absorbing article of the present invention can have a small thickness. Specifically, the thickness of the near-infrared ray absorbing article may be, for example, 0.3 mm or less, 0.23 mm or less, or 0.22 mm or less. In another example, the thickness may be in the range of 0.08 mm to 0.15 mm. As described above, when the near-infrared ray absorbing article does not have a uniform thickness throughout, a maximum thickness, a minimum thickness, or an average of the maximum and minimum thicknesses may be referred to as the thickness of the near-infrared ray absorbing article.

In the near-infrared ray absorbing article of the present invention, each of the first and second light-absorbing layers may include a pigment (a first pigment and a second pigment, respectively) so that optical properties such as the above-described transmittance can be exhibited, and the above-described optical properties of the light-absorbing layers can be controlled by controlling optical properties of the first and second pigments used in the light-absorbing layers. That is, as the first pigment and the second pigment respectively used in the first light-absorbing layer and the second light-absorbing layer, pigments having different optical properties and specifically different maximum absorption wavelength ranges may be used.

Specifically, the maximum absorption wavelength of the first pigment used in the first light-absorbing layer may be in the range of 850 nm to 1,200 nm. In addition, the maximum absorption wavelength of the second pigment used in the second light-absorbing layer may be in the range of 650 nm to 750 nm. That is, the first and second light-absorbing layers of the near-infrared ray absorbing article may have different optical properties. It has been described above that when a plurality of pigments having different optical properties are applied to one light-absorbing layer, visible transmittance and/or near-infrared (or infrared) absorption may be reduced due to the interaction between the pigments. However, in the present invention, since the pigments having different optical properties are applied to different layers and configured to be present independently of each other, improved optical properties can be secured.

The maximum absorption wavelengths of the first pigment and the second pigment may be the same as the maximum absorption wavelengths of the first light-absorbing layer and the second light-absorbing layer, respectively, or different. In addition, the maximum absorption wavelength of each of the first and second pigments may be the maximum absorption wavelength measured for the first or second pigment itself, the maximum absorption wavelength measured for a solution obtained by mixing the first or second pigment with a solvent, the maximum absorption wavelength of a light-absorbing layer formed of the pigment and a binder resin appropriately mixed with the pigment, or the maximum absorption wavelength of a laminate formed of the light-absorbing layer and a known glass substrate.

In the first light-absorbing layer or the second light-absorbing layer, the first pigment or the second pigment may be present in a state of being mixed with a first binder resin or a second binder resin. In this case, in the first light-absorbing layer or the second light-absorbing layer, the first pigment or the second pigment may be different from the second pigment or the first pigment in terms of the state in which the pigment is present in the first binder resin or the second binder resin.

In one example, the first light-absorbing layer may include the first binder resin and the first pigment dispersed in the first binder resin. That is, in the first light-absorbing layer, the first pigment is not dissolved in the other components (e.g., binder resin or solvent to be described below, etc.) and specifically may be present in a dispersed state in a matrix formed by the first binder resin. Specifically, the first pigment may be present in the form of independent particles in the first light-absorbing layer.

A method of designing a light-absorbing layer so that a specific pigment is present in a dispersed state in the light-absorbing layer is not particularly limited. For example, in the present invention, raw materials for forming the first light-absorbing layer or a composition for forming the light-absorbing layer may be adjusted to form a specific composition. Specifically, in the present invention, the first light-absorbing layer may be formed by curing a composition for forming a light-absorbing layer including the above-described first pigment, a first binder resin, and a solvent (i.e., first solvent). That is, the first light-absorbing layer may be a cured product of a composition for forming a light-absorbing layer including the first pigment, the first binder resin, and the first solvent. In this case, in order for the above-described first pigment to be present in a dispersed state in the first binder resin in the first light-absorbing layer, a solvent exhibiting a specific solubility for the first pigment and the first binder resin may be particularly used as the solvent (i.e., first solvent). Specifically, as the first solvent, a solvent having a first-pigment solubility of 15 g/L or less may be selected.

In the above, the solubility may refer to a ratio (g/L) of the mass (g) of a dissolved solute to the unit volume (L) of a solvent. In another example, the first-pigment solubility of the first solvent may be 0 g/L or more and 15 g/L or less. The above statement that the solubility is 0 g/L means that the solute does not dissolve in the solvent at all.

In addition, the solubility may be a value measured at room temperature. In the above, the term "room temperature" refers to a natural temperature that has not been particularly raised or lowered, and may specifically refer to any one temperature in the range of 15° C. to 30° C., any one temperature in the range of 20° C. to 25° C., or about 23° C.

As described above, when the first light-absorbing layer and the second light-absorbing layer having different optical properties are configured to be separated from each other, the first pigment is configured to be in a dispersed state in the first light-absorbing layer, and a specific solvent having the above-described first-pigment solubility is appropriately selected for a composition for forming the first light-absorbing layer, since the light transmittance of the first light-absorbing layer in the visible region (e.g., region corresponding to the wavelength range of 450 nm to 600 nm) can be increased, the near-infrared ray absorbing article including the light-absorbing layer can have both high transmittance in the visible region and high absorption (or high light blocking rate) in the infrared region (or near-infrared region; region corresponding to the wavelength range of 700 nm to 1,200 nm).

In addition, in order to configure the first light-absorbing layer so that the first pigment is present in a dispersed state in the first binder resin, a solvent having the above-described first-pigment solubility while having a first-binder solubility of about 100 g/L or more may be used. That is, as the composition for forming the first light-absorbing layer, a composition including a solvent that dissolves the first pigment having the above-described optical properties (maximum absorption wavelength) while not dissolving a first binder resin used in the composition may be used.

As described above, the second light-absorbing layer used in the near-infrared ray absorbing article of the present invention has physical properties and/or a composition that is/are different from that/those of the first light-absorbing layer. Therefore, the second light-absorbing layer may include at least a pigment (i.e., second pigment) that is different from the pigment used in the first light-absorbing layer. In addition, the second light-absorbing layer may include a second binder resin in addition to the second pigment. In this case, the second pigment may be present in a dissolved state in the second light-absorbing layer, unlike the first pigment in the first light-absorbing layer. Specifically, the second pigment may be present in a dissolved state in the solvent (i.e., second solvent) applied in the process of forming the second light-absorbing layer or in a state in which the second pigment colors the binder resin (i.e., second binder resin) used in the second light-absorbing layer.

Like the composition for forming the first light-absorbing layer, the above-described composition for forming the second light-absorbing layer may include the second pigment, a binder resin (i.e., second binder resin), and a solvent (i.e., second solvent). In addition, in order for the second pigment to be present in the state as described above in the second light-absorbing layer, a solvent having a specific second-pigment solubility may be selected as the second solvent. Specifically, since the second pigment may be present in a dissolved state in the second light-absorbing layer, it may be advantageous when the solubility of the second pigment in the second solvent exceeds a specific value. For example, the solubility of the second pigment in the second solvent may be more than 15 g/L. In another example, the solubility of the second pigment in the second solvent may be 20 g/L or more, 30 g/L or more, 40 g/L or more, 50 g/L or more, 60 g/L or more, 70 g/L or more, 80 g/L or more, 90 g/L or more, or 100 g/L or more. The upper limit is not particularly limited, and a solubility capable of sufficiently dissolving the second solvent is appropriate.

The first solvent or the second solvent applied in the process of forming the first light-absorbing layer or the second light-absorbing layer may be freely selected from among the known solvents, specifically the known organic solvents, as long as the solvent can satisfy the above-described first-pigment or second-pigment solubility. Specifically, in the composition for forming the first light-absorbing layer or the composition for forming the second light-absorbing layer, methyl isobutyl ketone, propylene glycol methyl ether acetate, diethylene glycol monoethyl ether, 3-methoxy butanol, ethylene glycol monobutyl ether acetate, 4-hydroxy-4-methyl-2-pentanone, γ-butyrolactone, cyclohexanone, toluene, pyridone, or the like may be used as the first solvent or the second solvent.

In the above, the binder resin may refer to a component used to impart the fixing ability between components forming the light-absorbing layer. Meanwhile, in the interest of securing the excellent optical properties of the near-infrared ray absorbing article, it may be appropriate to use an optically clear resin as the binder.

When it is stated that a material is optically clear, this may mean that the material has a transmittance of 90% or more, 95% or more, 99% or more, or about 100% for visible light such as light having a wavelength of 550 nm In addition, the first binder resin or the second binder resin used in the process of forming the first light-absorbing layer or the second light-absorbing layer may be freely selected from among the known binder resins as long as the binder resin can, together with the first pigment and the first solvent or the second pigment and the second solvent, exhibit the above-described properties.

As the binder resin, for example, one or more selected from among a cyclic olefin-based resin, a polyarylate resin, a polyisocyanate resin, a polyimide resin, a polyetherimide resin, a polyamideimide resin, an acrylic resin, a polycarbonate resin, and a polyethylene phthalate resin may be used. In the present invention, the first binder resin and the second binder resin may be the same or different from each other.

In the near-infrared ray absorbing article of the present invention, a method of forming the light-absorbing layer is not particularly limited. For example, the first light-absorbing layer and the second light-absorbing layer of the near-infrared ray absorbing article may be formed by curing compositions for forming a light-absorbing layer, specifically, the compositions including the above-described pigment, binder resin, and solvent. In the above, the curing method is not particularly limited, and a known curing method such as a thermal-curing method, a photocuring method, or a dual-curing method using heat and light may be used.

The near-infrared ray absorbing article of the present invention may be manufactured by preparing the composition for forming a first light-absorbing layer and the composition for forming a second light-absorbing layer, applying any one of these compositions onto a substrate (the above-described glass substrate or tempered glass substrate) and curing the composition, and then applying the other composition onto the cured layer or the other surface of the glass substrate and curing the composition.

As described above, the first and second light-absorbing layers may be respectively formed by applying (or forming a coating using) the compositions required for forming the first and second light-absorbing layers and then curing the compositions, and since the solvents are generally evaporated in the curing process, the first light-absorbing layer may include the first pigment and the first binder resin, and the second light-absorbing layer may include the second pigment and the second binder resin. In this case, since the first solvent applied in the process of forming the first light-absorbing layer does not dissolve more than a specific amount of first pigment and the first pigment is included in the form of particles in the composition, in the first light-absorbing layer, the first pigment may be present in a dispersed state in the first binder resin and specifically in the resin matrix formed by the first binder resin.

For the same reason, the second light-absorbing layer may include the second binder resin and the second pigment. In this case, the second solvent applied in the process of forming the second light-absorbing layer has high second-pigment solubility and thus the second pigment may be dissolved by the solvent in the composition for forming a second light-absorbing layer, but since the solvent is evaporated in the process of forming (curing) the second light-absorbing layer, the second light-absorbing layer may include the second binder resin and the second pigment, and the second pigment may be present in a state in which the second pigment colors the second binder resin.

In one example, the proportion of each of the first pigment and the second pigment is not particularly limited. For example, when the composition for forming the light-absorbing layer includes a binder resin, the proportion of each of the first pigment and the second pigment may be in the range of 0.01 to 10 parts by weight, 0.01 to 8 parts by weight, or 0.01 parts by weight to 5 parts by weight based on 100 parts by weight of the binder resin. The proportion of each of the first pigment and the second pigment may refer to the proportion of the pigment in the first light-absorbing layer or the second light-absorbing layer or the proportion of the pigment in the composition for forming the first or second light-absorbing layer.

In one example, in order for the first light-absorbing layer and/or the second light-absorbing layer to have additional maximum absorption wavelengths besides the above-described maximum absorption wavelengths, the first light-absorbing layer and/or the second light-absorbing layer may additionally contain a pigment (i.e., third pigment) that is different from the first pigment and/or the second pigment. In this case, the proportion of the third pigment may be in the range of 0.01 parts by weight to 5 parts by weight based on 100 parts by weight of the binder resin used in the composition for forming the light-absorbing layer or in the light-absorbing layer. When one type of pigment is used as the third pigment, the proportion may refer to the proportion of the one type of pigment, and when a combination of a plurality of pigments is additionally used, the proportion may refer to the proportions of the individual pigments.

In this case, the type of third pigment is not particularly limited. As the third pigment, one or more selected from among dyes, colorants, or metal complex-based compounds having a maximum absorption wavelength in the ultraviolet region or infrared (or near-infrared) region may be used. Specifically, examples of the additionally used third pigment may include indole-based, oxazole-based, merocyanine-based, cyanine-based, naphthalimide-based, oxadiazole-based, oxazine-based, oxazolidine-based, naphthalic acid-based, styryl-based, anthracene-based, cyclic carbonyl-based, triazole-based, phthalocyanine-based, naphthalocyanine-based, porphyrin-based, benzoporphyrin-based, squarylium-based, anthraquinone-based, chroconium-based, dithiol metal complex-based pigments, and the like. One type of third pigment may be applied to the first light-absorbing layer or the second light-absorbing layer, and in some cases, a combination of two or more of those listed above may be applied.

The type of first pigment is not particularly limited as long as it can have the above-described optical properties such as the above-described maximum absorption wavelength. As the first pigment, for example, a cyanine-based compound, a phthalocyanine-based compound, a naphthalocyanine-based compound, a porphyrin-based compound, a benzoporphyrin-based compound, a diimmonium-based compound, a squarylium-based compound, an anthraquinone-based compound, a croconium-based compound, a dithiol metal complex compound, or the like may be used.

Meanwhile, in consideration of the relationship between the first pigment and the maximum absorption wavelength of the first light-absorbing layer and in order for the second light-absorbing layer to have an maximum absorption wavelength in the above-described range, it may be advantageous to use a diimmonium-based compound as the first pigment.

The diimmonium-based compound may be, for example, a compound represented by Chemical Formula 1. Therefore, the first pigment may include the compound represented by Chemical Formula 1:

[Chemical Formula 1]

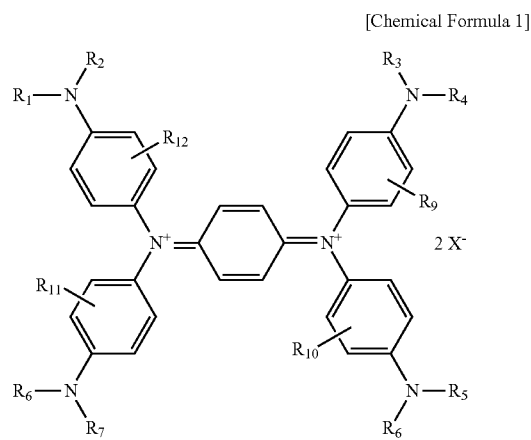

In Chemical Formula 1, $R_1$ to $R_8$ are each independently a hydrogen atom, an alkyl group, an aryl group, an aralkyl group, an alkenyl group, or an alkynyl group, $R_9$ to $R_{11}$ are each independently a hydrogen atom, a halogen group, an amino group, a cyano group, a nitro group, a carboxyl group, an alkyl group, or an alkoxy group, and X is an anion.

In one example, the anion may include $Cl^-$, $I^-$, $F^-$, $ClO_4^-$, $BF_4^-$, $SbF_6^-$, $CF_3SO_3^-$, $CH_3C_6H_4SO_3^-$, or the like.

As used herein, the term "alkyl group" may refer to a substituent derived from a saturated hydrocarbon having a straight or branched chain. As the alkyl group, for example, a methyl group, an ethyl group, an n-propyl group, an isopropyl group, an n-butyl group, a sec-butyl group, a tert-butyl group, an n-pentyl group, a 1,1-dimethylpropyl group, a 1,2-dimethylpropyl group, a 2,2-dimethylpropyl group, a 1-ethylpropyl group, a 2-ethylpropyl group, an n-hexyl group, a 1-methyl-2-ethylpropyl group, a 1-ethyl-2-methylpropyl group, a 1,1,2-trimethylpropyl group, a 1-propylpropyl group, a 1-methylbutyl group, a 2-methylbutyl group, a 1,1-dimethylbutyl group, a 1,2-dimethylbutyl group, a 2,2-dimethylbutyl group, a 1,3-dimethylbutyl group, a 2,3-dimethylbutyl group, a 2-ethylbutyl group, a 2-methylpentyl group, a 3-methylpentyl group, or the like may be used. In addition, the alkyl group may refer to a C1-C20, C1-C12, C1-C6, or C1-C4 alkyl group.

As used herein, the term "cycloalkyl group" may refer to a substituent derived from a monocyclic saturated hydrocarbon. As the cycloalkyl group, for example, a cyclopropyl group, a cyclobutyl group, a cyclopentyl group, a cyclohexyl group, a cycloheptyl group, a cyclooctyl group, or the like may be used. In addition, the cycloalkyl group may refer to a C3-C20, C3-C12, C3-C9, or C3-C6 cycloalkyl group.

As used herein, the term "aryl group" refers to a monovalent substituent derived from an aromatic hydrocarbon. As the aryl group, for example, a phenyl group, a naphthyl group, an anthracenyl group, a phenanthryl group, a naphthacenyl group, a pyrenyl group, a tolyl group, a biphenyl group, a terphenyl group, a chrycenyl group, a spirobifluorenyl group, a fluoranthenyl group, a fluorenyl group, a perylenyl group, an indenyl group, an azulenyl group, a heptalenyl group, a phenalenyl group, a phenanthrenyl group, or the like may be used. In addition, the aryl group may refer to a C6-C30, C6-C24, C6-C18, or C6-C12 aryl group As used herein, the term "aralkyl group" may refer to a monovalent substituent derived from a saturated hydrocarbon compound in which a monovalent substituent derived from an aromatic hydrocarbon is bonded to a hydrogen site of a terminal hydrocarbon. That is, the aralkyl group refers to an alkyl group whose chain ends are substituted with an aryl group. Examples of the aralkyl group may include a benzyl group, a methylbenzyl group, a phenethyl group, a phenylpropyl group, a naphthalenylmethyl group, a naphthalenylethyl group, and the like.

In one example, the type of second pigment also is not particularly limited as long as it can have the above-described optical properties such as the maximum absorption wavelength of the second light-absorbing layer or the second pigment itself. For example, as the second pigment, a compound which is included in the category of the above-described first pigment and satisfies the above-described optical properties but is a different type from the first pigment may be used.

Meanwhile, in the interest of having the maximum absorption wavelength of the above-described second pigment itself or the second light-absorbing layer, as the second pigment, a pigment including a squarylium-based compound may be applied. The squarylium-based compound may be a compound represented by Chemical Formula 2. That is, the second pigment may include the compound represented by Chemical Formula 2:

[Chemical Formula 2]

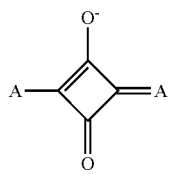

In Chemical Formula 2, A is an aminophenyl group, an indolyl methylene group, an indolinyl group, or a perimidine group, and two As centered about

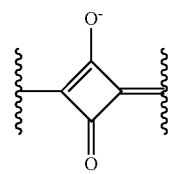 [SMILES: *C1=C([O-])C(=*)C1=O]

are conjugated with each other, and any one or more of hydrogens present in the aminophenyl group, indolyl methylene group, indolinyl group, or perimidine group are each independently hydrogen, a halogen group, a hydroxyl group, a cyano group, a nitro group, a carboxyl group, a C1-C20 alkyl group, a C3-C20 cycloalkyl group, a C1-C10 alkoxy group, a C7-C20 aralkyl group, a C6-C20 aryl group, a sulfonamide group, or an amide group substituted or unsubstituted with a C1-C4 alkyl group, a C1-C4 haloalkyl group, or a C7-C20 aralkyl group.

In addition, in Chemical Formula 2, when any one or more of the hydrogens present in the aminophenyl group, indolyl methylene group, indolinyl group, or perimidine group are each independently an aryl group, the aryl group may be additionally substituted with a C1-C4 alkyl group or a C1-C4 alkoxy group.

The compound represented by Chemical Formula 2 may be specifically any one of compounds represented by Chemical Formulas 2a to 2d:

[Chemical Formula 2a]

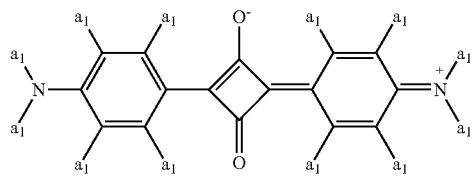

[Chemical Formula 2b]

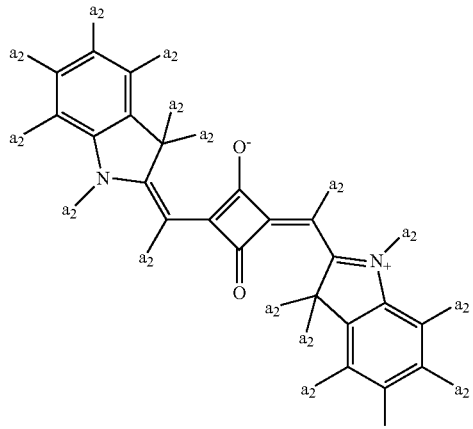

[Chemical Formula 2c]

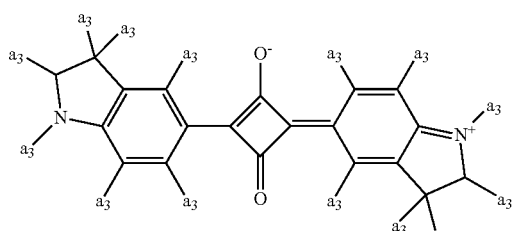

[Chemical Formula 2d]

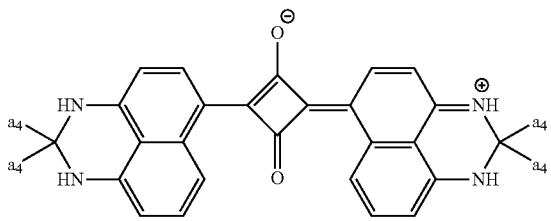

In Chemical Formulas 2a to 2d, $a_1$, $a_2$, $a_3$, and $a_4$ are each independently hydrogen, a halogen group, a hydroxyl group, a cyano group, a nitro group, a carboxyl group, a C1-C20 alkyl group, a C3-C10 cycloalkyl group, a C1-C6 alkoxy group, a C7-C20 aralkyl group, a C6-C20 aryl group, a sulfonamide group, or an amide group substituted or unsubstituted with a C1-C4 alkyl group, a C1-C4 haloalkyl group, or a C7-C20 aralkyl group. In addition, in another example, in Chemical Formulas 2a to 2d, when $a_1$, $a_2$, $a_3$, and $a_4$ are each independently a C6-C20 aryl group, one or more hydrogens of the aryl group may be additionally substituted with a C1-C4 alkyl group or a C1-C4 alkoxy group.

Another aspect of the present invention provides an optical filter including the near-infrared ray absorbing article. Specifically, an optical filter of the present invention may be a near-infrared (or infrared) cut-off filter.

The optical filter includes the above-described near-infrared ray absorbing article and a selective wavelength reflection layer present on one or both surfaces of the near-infrared ray absorbing article. In the above, the term "selective wavelength reflection layer" may refer to a functional optical member or layer formed to reflect light of a specific wavelength while transmitting rather than reflecting light having a different wavelength from the reflected light.

Specifically, the selective wavelength reflection layer used in an optical filter of the present invention may refer to a functional layer designed such that the selective wavelength reflection layer reflects light having a wavelength of 650 nm or more, for example, light having a wavelength in the range of 700 nm to 1,200 nm, among the light incident on the optical filter and thus blocks light in this wavelength range so that the light cannot be transmitted through the optical filter and/or prevents light having a wavelength in the range of 400 nm to 650 nm from being reflected, that is, allows light in this wavelength range to be transmitted. That is, the selective wavelength reflection layer may serve as a near-infrared reflection layer for reflecting near-infrared rays and/or an anti-visible-light reflection layer for preventing visible light from being reflected.

The selective wavelength reflection layer may include a multilayer dielectric film. That is, the optical filter of the present invention may be formed by forming a multilayer dielectric film on one or both surfaces of the above-described near-infrared ray absorbing article.

In one example, the multilayer dielectric film may have a structure in which dielectric films having different refractive indices are alternately formed. For example, the dielectric films may be formed by repeating the order of low refractive index-high refractive index-low reflective index dielectric films or high refractive index-low refractive index-high reflective index dielectric films. A difference in refractive index between the high refractive index dielectric layer and the low refractive index dielectric layer may be 0.2 or more, 0.3 or more, 0.4 or more, or 0.5 or more, and 1.5 or less or 1.0 or less. Here, a reference wavelength for the refractive indices may be 550 nm.

In the above, the refractive index of the low refractive index dielectric film may be in the range of 1.4 to 1.6. Examples of a low refractive index dielectric film having this refractive index value may include silicon dioxide, lanthanum fluoride, magnesium fluoride, sodium aluminum hexafluoride, and the like. Here, a reference wavelength for the refractive index may be 550 nm.

In the above, the refractive index of the high refractive index dielectric film may be in the range of 2.1 to 2.5. Examples of a high refractive index dielectric film having this refractive index value may include titanium dioxide, aluminum oxide, zirconium oxide, tantalum pentoxide, niobium pentoxide, lanthanum oxide, yttrium oxide, zinc oxide, zinc sulfide, indium oxide, and the like, wherein the indium oxide may include titanium dioxide, tin oxide, cerium oxide, and the like. Here, a reference wavelength for the refractive index may be 550 nm.

In another example, in the optical filter, the high refractive index dielectric film and the low refractive index dielectric film may be formed to be separated from each other. In one example, a high refractive index dielectric film or a low refractive index dielectric film may be present on one surface of the near-infrared ray absorbing article while a low refractive index dielectric film or a high refractive index dielectric film is present on the other surface. In another example, a high refractive index dielectric film and a low refractive index dielectric film may be present, in the order as written or in reverse order, on one surface of the near-infrared ray absorbing article, and the above-described separation layer may be present between the high refractive index dielectric film and the low refractive index dielectric film.

Still another aspect of the present invention provides an imaging device. The imaging device includes the above-described optical filter (specifically, a near-infrared cut-off filter or the like) or the above-described near-infrared ray absorbing article.

The imaging device may include all known essential components for imparting functions to the imaging device. For example, the imaging device may include a lens and an image sensor in addition to the above-described optical apparatus or the above-described near-infrared ray absorbing article.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
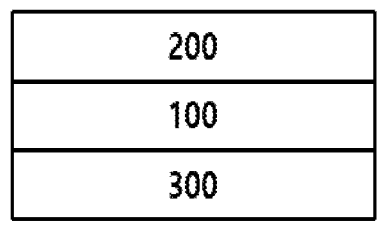
FIGS. 1 to 4 illustrate laminated structures of near-infrared ray absorbing articles according to exemplary embodiments of the present invention.
Figure 2:
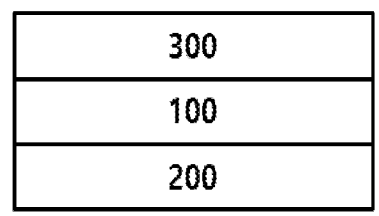
Figure 3:
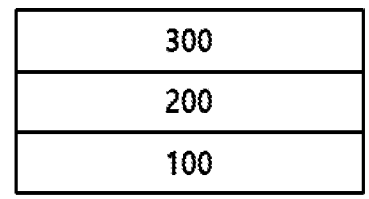
Figure 4:
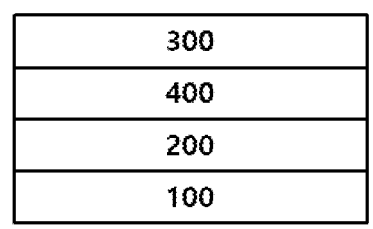

Hereinafter, the present invention will be described in detail through Examples and Comparative Examples. However, the scope of the present invention is not limited by Examples and Comparative Examples described below.

[Measurement of Light Transmittance]

The transmittance of the resultants of Preparation Examples, Examples, and Comparative Examples according to wavelength was measured, using a spectrophotometer (Lambda 750 spectrophotometer commercially available from PerkinElmer Inc.), in accordance with the user's manual for the instrument.

[Measurement of Haze]

The haze of the resultants of Examples and Comparative Examples for light having a wavelength of 550 nm was measured, using a haze meter (NDH 2000N commercially available from Nippon Denshoku Industries Co., Ltd.), by the JIS K 7136 test method in accordance with the user's manual for the instrument.

[Manufacture of Tempered Glass Substrate]

A tempered glass substrate was manufactured according to the following method:

i) Aluminosilicate glass (AS 87 commercially available from Schott AG) was washed with an aqueous alkali solution to obtain a glass substrate having a thickness of about 0.1 mm.

ii) The glass substrate was immersed in a potassium nitrate solution and the solution was thermally treated at a temperature of 390° C. for about 40 minutes, and thereby a glass substrate including a first compressive stress layer and a second compressive stress layer, each of which was formed inwardly from each surface of the glass substrate to have a thickness of about 17.5 μm, was obtained.

[Products Used]

The following is information on main products used in Preparation Examples, Comparative Examples, and Examples.

Aluminosilicate glass: AS 87 commercially available from Schott AG

Polyacrylate-based binder resin: Sumipex commercially available from Sumitomo Chemical Co., Ltd.

First pigment: IRA 1032 (diimmonium-based compound) commercially available from Exciton Second pigment: IRA 705 (squarylium-based compound) commercially available from Exciton Third pigment: ADA3232 (compound having an absorption maximum in the wavelength range of 300 nm to 400 nm) commercially available from H.W.Sands Corp.

Fourth pigment: S 0094 (cyanine-based compound having an absorption maximum in the wavelength range of 800 nm to 850 nm) commercially available from FEW Chemicals GmbH Dispersant: Disperbyk-110 commercially available from BYK Preparation Example 1. Laminate A laminate was formed according to the following procedure.

i) A composition was prepared by mixing the polyacrylate-based binder resin, and 3 parts by weight of the first pigment and 500 parts by weight of methyl isobutyl ketone based on 100 parts by weight of the binder resin.

ii) The composition was applied onto one surface of the tempered glass substrate by spin-coating and thermally cured at 140° C. for about two hours, and thereby a light-absorbing layer having a thickness of about 3 μm was formed and thus a laminate was obtained.

Preparation Example 2. Laminate

A laminate was obtained in the same manner as in Preparation Example 1 except that, in the step i), a composition was prepared using the second pigment at 5 parts by weight instead of the first pigment.

Preparation Example 3. Laminate

A laminate was obtained in the same manner as in Preparation Example 1 except that, in the step i), a mixture of 5 parts by weight of the second pigment (IRA 705 commercially available from Exciton), 3 parts by weight of the third pigment, and 0.1 parts by weight of the fourth pigment was used instead of the first pigment.

Figure 5:
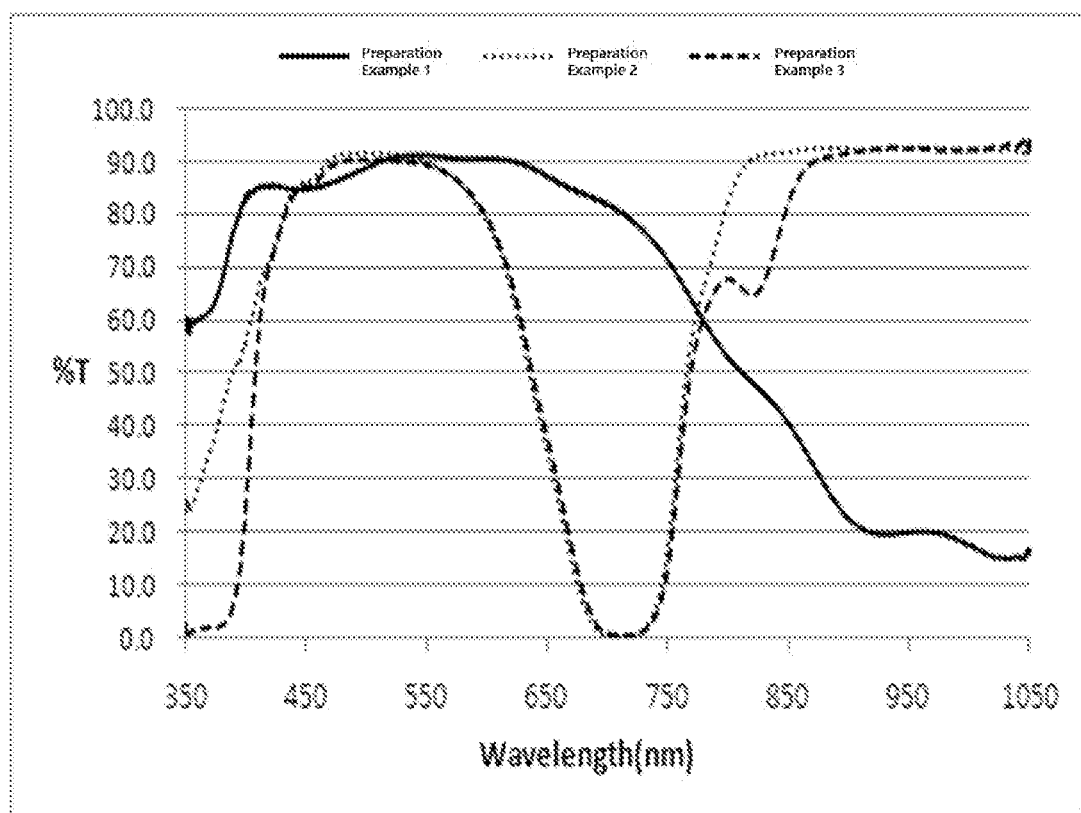
FIG. 5 is a set of transmittance spectra of Preparation Examples 1 to 3 of the present invention.

The transmittance spectra obtained from the light-absorbing layer specimens prepared in Preparation Examples 1 to 3 are shown in FIG. 5. Referring to FIG. 5, it can be seen that the maximum absorption wavelength of the first pigment, specifically a light-absorbing layer containing the pigment, is in the wavelength range of 850 nm to 1,200 nm (Preparation Example 1). In addition, referring to FIG. 5, the maximum absorption wavelength of the second pigment, specifically a light-absorbing layer containing the pigment, is in the range of 650 nm to 750 nm (Preparation Example 2). In this case, it can be seen that when the second pigment is mixed with an additional specific pigment, due to the added pigment, the light-absorbing layer can have additional absorption maxima in the wavelength ranges of 300 nm to 400 nm and/or 800 nm to 850 nm without a decrease in visible transmittance and near-infrared absorption (Preparation Example 3).

Preparation Example 4. Laminate

A laminate was obtained in the same manner as in Preparation Example 1 except that, in the step i), a composition was prepared by mixing the polyacrylate-based binder resin, and 5 parts by weight of the first pigment and 500 parts by weight of methyl isobutyl ketone based on 100 parts by weight of the polyacrylate-based binder resin, adding the dispersant at 0.2 parts by weight to the mixture, and dispersing particles for about six hours using dispersion equipment and 0.5 mm zirconia beads. In the light-absorbing layer of Preparation Example 4, the first pigment, which is a diimmonium-based pigment, was present in a dispersed state in the binder resin.

Preparation Example 5. Laminate

A laminate was obtained in the same manner as in Preparation Example 4 except that, in the step i), the polyacrylate-based binder resin, and 5 parts by weight of the first pigment and 500 parts by weight of cyclohexanone based on 100 parts by weight of the polyacrylate-based binder resin were mixed and then were adjusted so that the first pigment was present in a dissolved state in the composition and present in a state in which the first pigment colored the binder resin in the light-absorbing layer formed of the composition.

Figure 6:
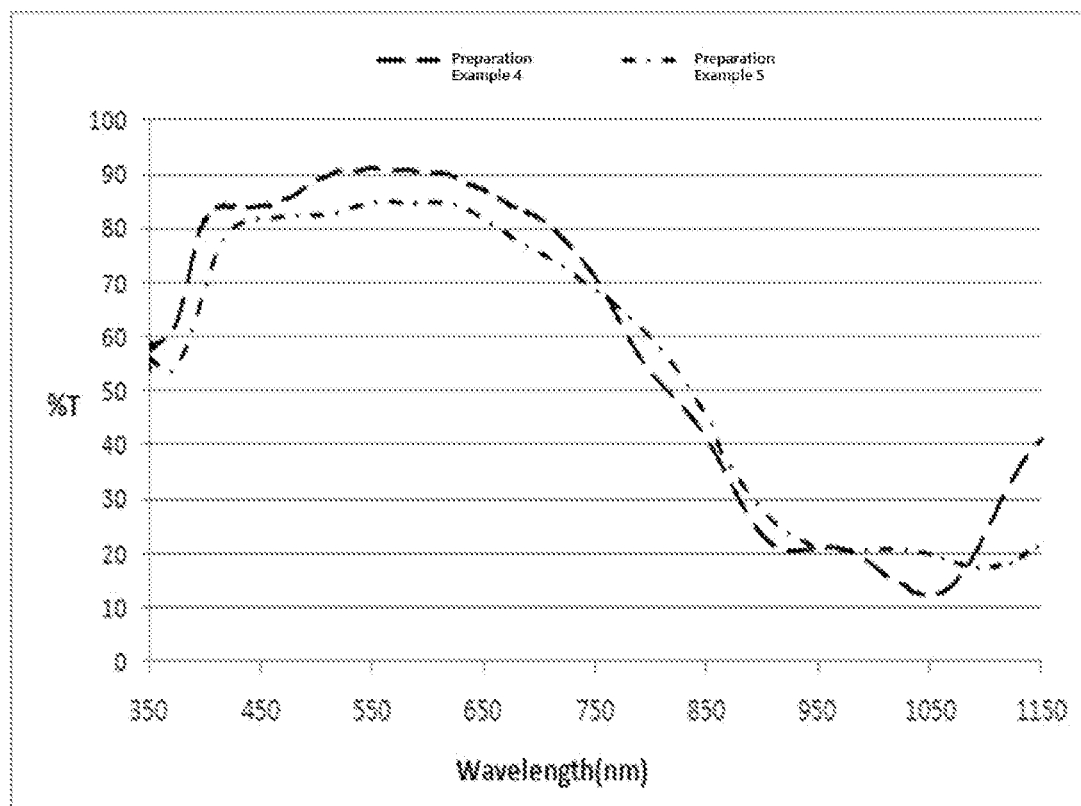
FIG. 6 is a set of transmittance spectra of Preparation Examples 4 and 5.

The transmittance spectra obtained from the light-absorbing layers of Preparation Examples 4 and 5 are shown in FIG. 6, and the transmittance in main wavelength ranges is shown in Table 1. It can be seen that the transmittance in the visible region (450 nm to 700 nm) and the absorbance in the near-infrared region (about 1,050 nm) were higher in the light-absorbing layer of Preparation Example 4 than in the light-absorbing layer of Preparation Example 5. It was confirmed that this was because the dissolution of the first pigment had caused degradation of a layer (light-absorbing layer of Preparation Example 2) containing the first pigment.

Through this, it can be seen that when the first pigment used in the present invention is present in a dispersed state (in the form of particles) in the binder resin rather than dissolved in the light-absorbing layer, a light-absorbing layer having both high visible transmittance and high infrared absorbance can be formed.

TABLE 1

| Classification | Light transmittance (T %) | | |
|---|---|---|---|
| | @425 nm | @550 nm | @1,050 nm |
| Preparation Example 4 | 84.5 | 91.5 | 12.4 |
| Preparation Example 5 | 79.5 | 84.5 | 19.8 |

Preparation Example 6. Laminate

A laminate was obtained in the same manner as in Preparation Example 1 except that, in the step i), diethylene glycol monoethyl ether having a first-pigment solubility of about 0 g/L at room temperature was used instead of methyl isobutyl ketone.

Preparation Example 7. Laminate

A laminate was obtained in the same manner as in Preparation Example 1 except that, in the step i), 4-hydroxy- 4-methyl-2-pentanone having a first-pigment solubility of about 5 g/L at room temperature was used instead of methyl isobutyl ketone.

Preparation Example 8. Laminate

A laminate was obtained in the same manner as in Preparation Example 1 except that, in the step i), propylene glycol methyl ether acetate having a first-pigment solubility of about 10 g/L at room temperature was used instead of methyl isobutyl ketone.

Preparation Example 9. Laminate

A laminate was obtained in the same manner as in Preparation Example 1 except that, in the step i), chlorobenzene having a first-pigment solubility of about 15 g/L at room temperature was used instead of methyl isobutyl ketone.

Preparation Example 10. Laminate

A laminate was obtained in the same manner as in Preparation Example 1 except that, in the step i), isophorone having a first-pigment solubility of about 20 g/L at room temperature was used instead of methyl isobutyl ketone.

Preparation Example 11. Laminate

A laminate was obtained in the same manner as in Preparation Example 1 except that, in the step i), γ-butyrolactone having a first-pigment solubility of about 30 g/L at room temperature was used instead of methyl isobutyl ketone.

Figure 7:
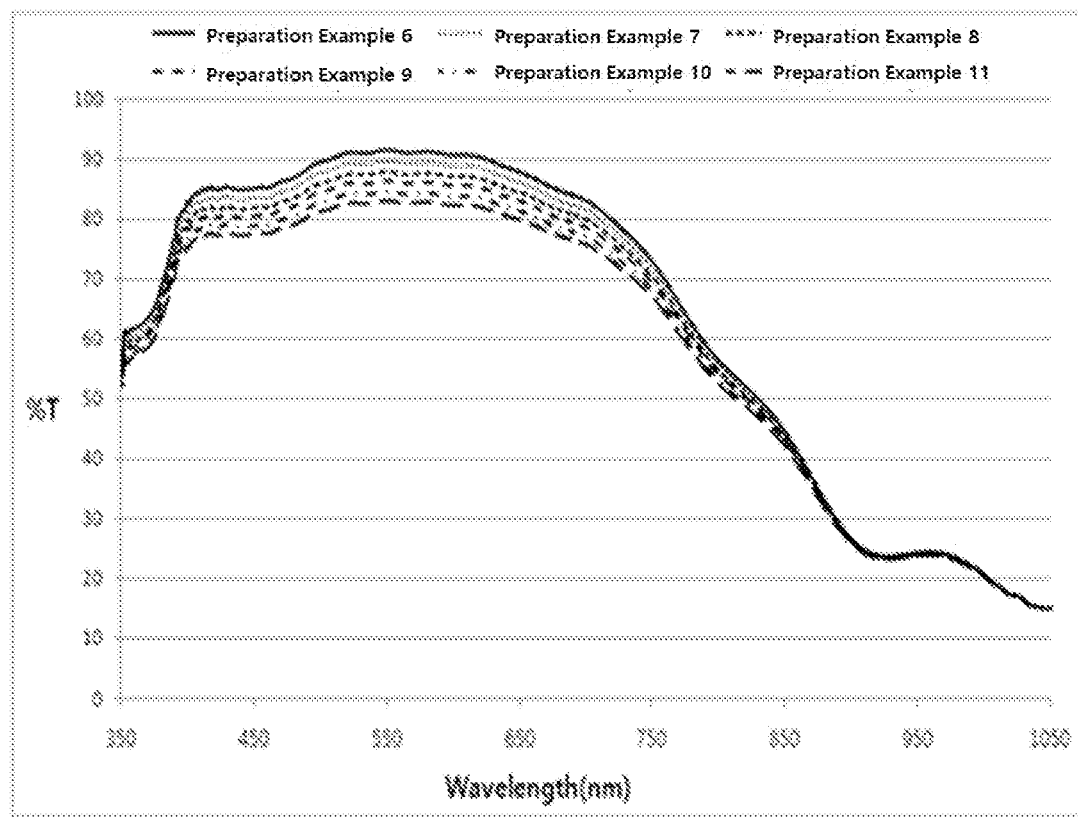
FIG. 7 is a set of transmittance spectra of Preparation Examples 6 to 11.

The transmittance spectra obtained from the laminates of Preparation Examples 6 to 11 are shown in FIG. 7. Referring to FIG. 7, it can be seen that when a solvent having low first-pigment solubility is used, the transmittance in the visible region is improved. Through this, it can be seen that in order to have appropriate visible transmittance (e.g., average light transmittance of 85% or more for a wavelength in the range of 465 nm to 570 nm) desired in the present invention, it is advantageous to use a solvent having as low first-pigment solubility as possible when forming a light-absorbing layer.

Preparation Example 12. Near-Infrared Ray Absorbing Article

A near-infrared ray absorbing article was manufactured according to the following procedure.
i) Composition for Forming First Light-Absorbing Layer
Based on 100 parts by weight of the polyacrylate-based binder resin, 1 part by weight of the first pigment and 500 parts by weight of methyl isobutyl ketone were added, and after adding 0.2 parts by weight of the dispersant, particles were dispersed at an appropriate rotational speed (rpm) for about six hours using dispersion equipment, and thereby a composition for forming a first light-absorbing layer in which the first pigment was present in a dispersed state in the form of particles was obtained.
ii) Composition for Forming Second Light-Absorbing Layer
Based on 100 parts by weight of the polyacrylate-based binder resin, 5 parts by weight of the second pigment and 500 parts by weight of methyl isobutyl ketone were added, and thereby a composition for forming a second light-absorbing layer in a state in which the second pigment was dissolved and colored the binder resin was obtained.
iii) Adhesive Composition
An adhesive composition was prepared by mixing a commercially available polyacrylate resin and a commercially available polyisocyanate-based resin in the weight ratio of 99:1 (polyacrylate resin:polyisocyanate-based resin).
iv) Near-Infrared Ray Absorbing Article
The composition for forming a first light-absorbing layer was applied onto one surface of a tempered glass substrate by spin-coating and thermally treated at a temperature of about 140° C. for about two hours, and thereby a first light-absorbing layer having a thickness of about 3 μm was obtained.

Subsequently, the above-described adhesive composition was applied onto the first light-absorbing layer by performing spin-coating at a rotational speed of 1,000 rpm for about 15 seconds and thermally treated at a temperature of about 130° C. for about 15 minutes, and thereby an adhesive layer having a thickness of about 0.4 μm was obtained.

Subsequently, the composition for forming a second light-absorbing layer was applied onto the adhesive layer by spin-coating and thermally treated at a temperature of 140° C. for about three hours, and thereby a second light-absorbing layer having a thickness of about 3 μm was formed and thus a near-infrared ray absorbing article was obtained.

Preparation Example 13. Near-Infrared Ray Absorbing Article

A near-infrared ray absorbing article was obtained in the same manner as in Preparation Example 12 except that, in the step ii), a composition for forming a second light-absorbing layer was prepared using a mixture of 5 parts by weight of the second pigment, 3 parts by weight of the third pigment, and 0.1 parts by weight of the fourth pigment instead of the second pigment alone.

Preparation Example 14. Near-Infrared Ray Absorbing Article i) Composition for Forming Light-Absorbing Layer
Based on 100 parts by weight of the polyacrylate-based binder resin, 1 part by weight of the first pigment, 5 parts by weight of the second pigment and 500 parts by weight of methyl isobutyl ketone were added, and after adding 0.2 parts by weight of the dispersant, particles were dispersed using dispersion equipment and zirconia beads, and thereby a composition for forming a light-absorbing layer in which the first pigment was present in a dispersed state and the second pigment was present in a dissolved state was obtained.
ii) Near-Infrared Ray Absorbing Article
The composition for forming a light-absorbing layer was applied onto one surface of a tempered glass substrate by spin-coating and thermally treated at a temperature of about 140° C. for about two hours, and thereby a first light-absorbing layer having a thickness of about 3 μm was formed and thus a near-infrared ray absorbing article was obtained.

Figure 8:
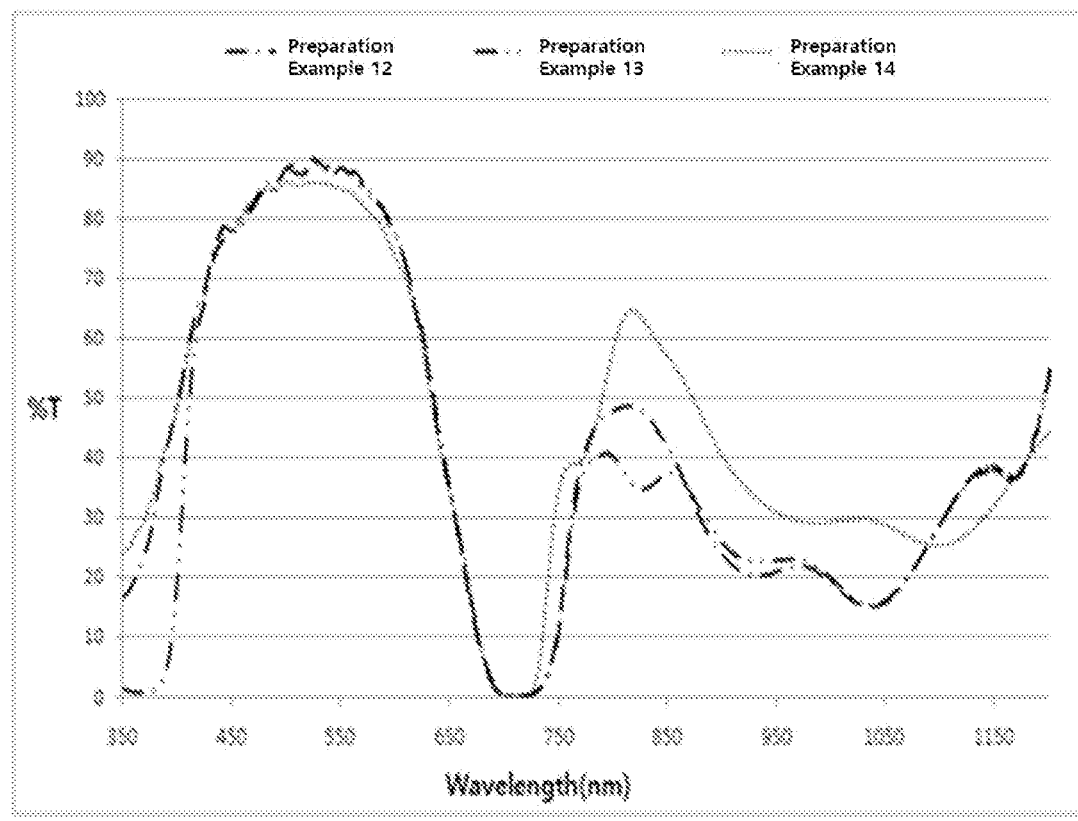
FIG. 8 is a set of transmittance spectra of Preparation Examples 12 to 14.

Referring to FIG. 8, it can be seen that the near-infrared ray absorbing articles of Preparation Examples 12 and 13 had improved visible transmittance and improved near-infrared absorption as compared to the near-infrared ray absorbing article of Preparation Example 14. From this, it can be seen that compared to when a light absorbing layer for a near-infrared ray absorbing article was configured as a single layer (Preparation Example 14), when the light absorbing layer was configured as a plurality of layers separated from each other (Preparation Examples 12 and 13), improved optical properties were exhibited. In addition, from this, it can be seen that a near-infrared ray absorbing article configured so that light-absorbing layers containing pigments having different optical properties were present while being separated from each other had improved heat resistance. This is presumed to be because no interaction had occurred between organic materials, such as the pigments having different optical properties, used in the light-absorbing layers.

Preparation Example 15. Near-Infrared Ray Absorbing Article i) Composition for Forming First Light-Absorbing Layer Based on 100 parts by weight of the polyacrylate-based binder resin, 1 part by weight of the first pigment and 500 parts by weight of diethylene glycol monoethyl ether (solvent having a room-temperature solubility of about 0 g/L for the first pigment) were added, and after adding 0.2 parts by weight of the dispersant, particles were appropriately dispersed using dispersion equipment and zirconia beads, and thereby a composition for forming a first light-absorbing layer in which the first pigment was present in a dispersed state in the form of particles was obtained.

ii) Composition for Forming Second Light-Absorbing Layer

Based on 100 parts by weight of the polyacrylate-based binder resin, 5 parts by weight of the second pigment, 3 parts by weight of the third pigment, 0.1 parts by weight of the fourth pigment, and 500 parts by weight of methyl isobutyl ketone were added, and thereby a composition for forming a second light-absorbing layer was obtained.

iii) Adhesive Composition

An adhesive composition was prepared by mixing a commercially available polyacrylate resin and a commercially available polyisocyanate-based resin in the weight ratio of 99:1 (polyacrylate resin:polyisocyanate-based resin).

iv) Near-Infrared Ray Absorbing Article

The composition for forming a first light-absorbing layer was applied onto one surface of a tempered glass substrate by spin-coating and thermally treated at a temperature of about 140° C. for about two hours, and thereby a first light-absorbing layer having a thickness of about 3 μm was obtained.

Subsequently, the above-described adhesive composition was applied onto the first light-absorbing layer by performing spin-coating at a rotational speed of 1,000 rpm for about 15 seconds and thermally treated at a temperature of about 130° C. for about 15 minutes, and thereby an adhesive layer having a thickness of about 0.4 μm was obtained.

Subsequently, the composition for forming a second light-absorbing layer was applied onto the adhesive layer by spin-coating and thermally treated at a temperature of 140° C. for about three hours, and thereby a second light-absorbing layer having a thickness of about 3 μm was formed and thus a near-infrared ray absorbing article was obtained.

Preparation Example 16. Near-Infrared Ray Absorbing Article

A near-infrared ray absorbing article was obtained in the same manner as in Preparation Example 15 except that, in the step i), 4-hydroxy-4-methyl-2-pentanone (solvent having a first-pigment solubility of about 5 g/L at room temperature) was added instead of diethylene glycol monoethyl ether.

Preparation Example 17. Near-Infrared Ray Absorbing Article

A near-infrared ray absorbing article was obtained in the same manner as in Preparation Example 16 except that, in the step i), propylene glycol methyl ether acetate (solvent having a first-pigment solubility of about 10 g/L at room temperature) was used instead of 4-hydroxy-4-methyl-2-pentanone.

Preparation Example 18. Near-Infrared Ray Absorbing Article

A near-infrared ray absorbing article was obtained in the same manner as in Preparation Example 16 except that, in the step i), chlorobenzene (solvent having a first-pigment solubility of about 15 g/L at room temperature) was used instead of 4-hydroxy-4-methyl-2-pentanone.

Preparation Example 19. Near-Infrared Ray Absorbing Article

A near-infrared ray absorbing article was obtained in the same manner as in Preparation Example 16 except that, in the step i), isophorone (solvent having a first-pigment solubility of about 20 g/L at room temperature) was used instead of 4-hydroxy-4-methyl-2-pentanone.

Preparation Example 20. Near-Infrared Ray Absorbing Article

A near-infrared ray absorbing article was obtained in the same manner as in Preparation Example 16 except that, in the step i), butyrolactone (solvent having a first-pigment solubility of about 30 g/L at room temperature) was used instead of 4-hydroxy-4-methyl-2-pentanone.

Figure 9:
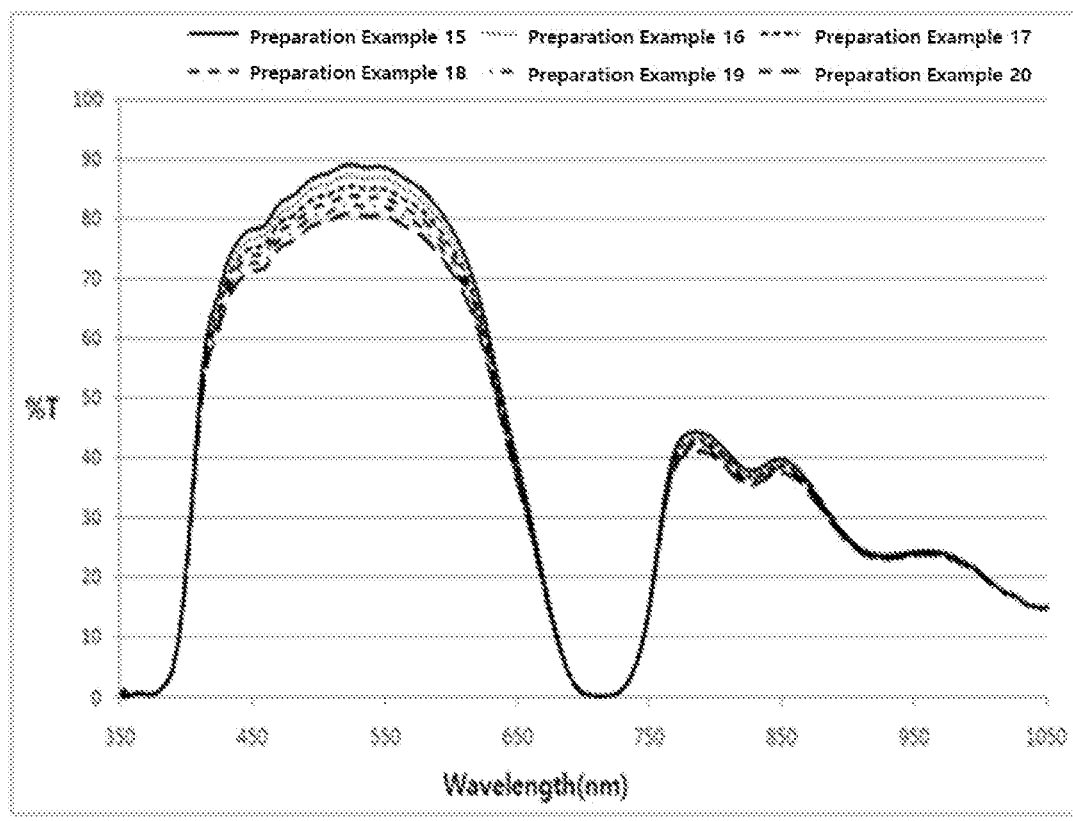
FIG. 9 is a set of transmittance spectra of Preparation Examples 15 to 20.

The transmittance spectra of the near-infrared ray absorbing articles of Preparation Examples 15 to 20 are shown in FIG. 9. Referring to FIG. 9, it can be seen that the near-infrared ray absorbing articles of Preparation Examples 15 to 18 had improved visible transmittance as compared to the near-infrared ray absorbing articles of Preparation Examples 19 and 20. Through this, it can be seen that when a layer in which the first pigment is present in a dispersed state in a solvent having a specific solubility was used as the first light-absorbing layer as specified in the present invention, the properties desired in the present invention, such as excellent visible transmittance, can be exhibited.

Comparative Example 1. Near-Infrared Ray Absorbing Article i) Composition for Forming First Light-Absorbing Layer Based on 100 parts by weight of the polyacrylate-based binder resin, 1 part by weight of the first pigment and 500 parts by weight of diethylene glycol monoethyl ether (solvent having a first-pigment solubility of about 0 g/L at room temperature) were added, and after adding 0.2 parts by weight of the first pigment, particles were dispersed for about six hours using dispersing equipment and zirconia beads, and thereby a composition for forming a first light-absorbing layer in which the first pigment was present in a dispersed state in the form of particles was obtained.

ii) Composition for Forming Second Light-Absorbing Layer

Based on 100 parts by weight of the polyacrylate-based binder resin, 5 parts by weight of the second pigment and 500 parts by weight of methyl isobutyl ketone were mixed, and thereby a composition for forming a second light-absorbing layer in a state in which the second pigment was dissolved was obtained.

iii) Near-Infrared Ray Absorbing Article

The composition for forming a first light-absorbing layer was applied onto one surface of a tempered glass substrate by spin-coating and thermally treated at a temperature of about 140° C. for about two hours, and thereby a first light-absorbing layer having a thickness of about 3 μm was obtained.

Subsequently, the above-described composition for forming a second light-absorbing layer was applied onto the first light-absorbing layer by spin-coating and thermally treated at a temperature of 140° C. for about three hours, and thereby a second light-absorbing layer having a thickness of about 3 μm was formed and thus a near-infrared ray absorbing article was obtained.

Comparative Example 2. Near-Infrared Ray Absorbing Article

A near-infrared ray absorbing article was obtained in the same manner as in Preparation Example 15 except that, in the step iv), the adhesive composition was applied by performing spin-coating at a rotational speed of 3,000 rpm for about 15 seconds. In this case, the thickness of the adhesive layer was about 0.05 μm.

Comparative Example 3. Near-Infrared Ray Absorbing Article

A near-infrared ray absorbing article was obtained in the same manner as in Preparation Example 15 except that, in the step iv), the adhesive composition was applied by performing spin-coating at a rotational speed of 2,000 rpm for about 15 seconds. In this case, the thickness of the adhesive layer was about 0.1 μm.

Example 1. Near-Infrared Ray Absorbing Article

A near-infrared ray absorbing article was obtained in the same manner as in Preparation Example 15 except that, in the step iv), the adhesive composition was applied by performing spin-coating at a rotational speed of 1,500 rpm for about 15 seconds. In this case, the thickness of the adhesive layer was about 0.2 μm.

Example 2. Near-Infrared Ray Absorbing Article

A near-infrared ray absorbing article was obtained in the same manner as in Preparation Example 15.

Figure 10:
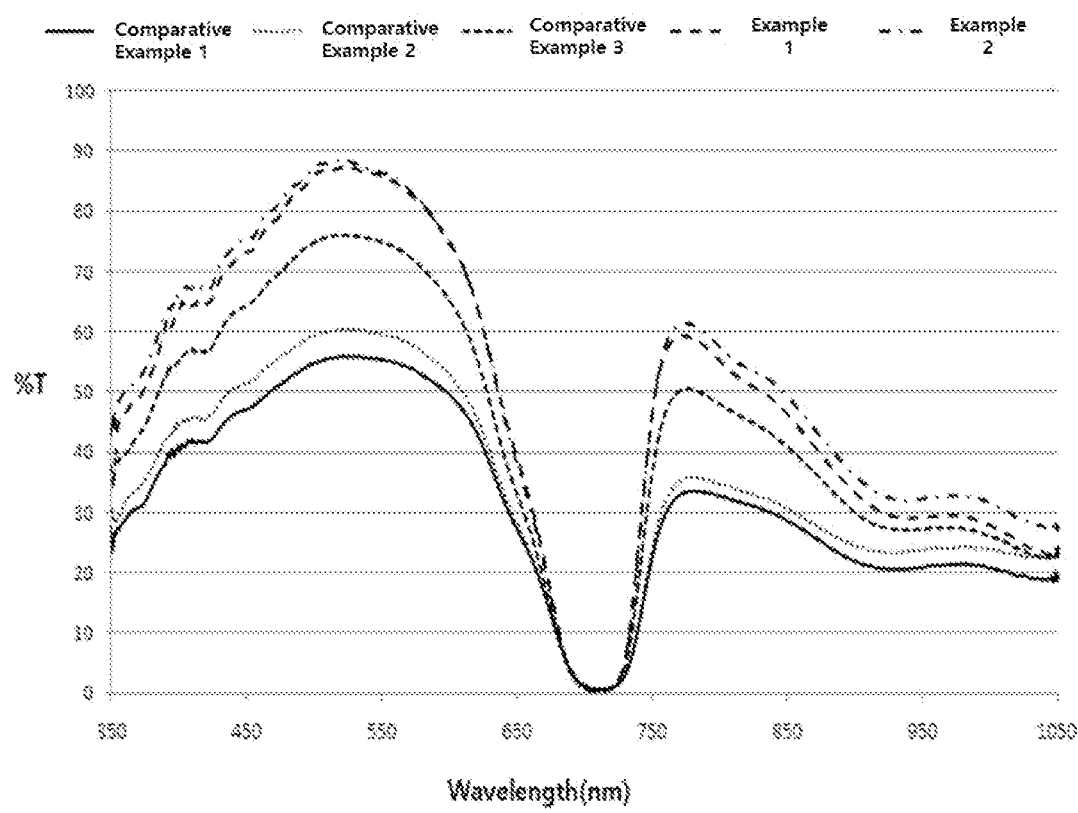
FIG. 10 is a set of transmittance spectra of Examples 1 and 2 and Comparative Examples 1 to 3.

FIG. 10 is a set of transmittance spectra of the near-infrared ray absorbing articles of Comparative Examples 1 to 3 and Examples 1 and 2. In addition, Table 2 shows the results of measuring the haze of the near-infrared ray absorbing articles of Examples and Comparative Examples. Referring to FIG. 10, it can be seen that the near-infrared ray absorbing articles of Examples have improved visible transmittance and improved near-infrared absorption (or blocking rate) as compared to the absorbing articles of Comparative Examples. In addition, referring to Table 2, it can be seen that the near-infrared ray absorbing articles of Examples have much lower haze than those of Comparative Examples, for example, a haze of 0.3% or less. This can only be achieved when the first and second light-absorbing layers having the above-described optical properties are configured to be separated from each other. In particular, in an imaging device in which a near-infrared ray absorbing article is used, it is required that the near-infrared ray absorbing article has high transmittance in the visible region and high absorption in the near-infrared region, and at the same time, secures an optical characteristic of having a haze of less than 0.3% in the typical visible region (e.g., light having a wavelength of about 550 nm) in the interest of securing a high quality image, and the near-infrared ray absorbing articles of Examples satisfy all of these conditions.

Through this, it can be seen that particularly, as in Comparative Examples, when an adhesive layer is not present as a separation layer between the first and second light-absorbing layers or when an adhesive layer is present but has an excessively small thickness and thus cannot separate the first and second light-absorbing layers, the optical properties desired in the present invention, for example, low haze, cannot be exhibited. That is, only when a plurality of light-absorbing layers having specific and different optical properties are disposed to be separated from each other as in the present invention, since the interaction between components forming the light-absorbing layers does not occur, a near-infrared ray absorbing article particularly suitable for an imaging device can be obtained.

TABLE 2

|  | Comparative Example 1 | Comparative Example 2 | Comparative Example 3 | Example 1 | Example 2 |
| --- | --- | --- | --- | --- | --- |
| Thickness of adhesive layer (μm) | 0 | 0.05 | 0.1 | 0.2 | 0.4 |
| Haze (%) | 13.83 | 12.77 | 3.41 | 0.19 | 0.08 |

The near-infrared ray absorbing article of the present invention is capable of preventing a decrease in visible transmittance and near-infrared absorption due to the interaction between a plurality of organic materials forming the light-absorbing layers.

In addition, the near-infrared ray absorbing article of the present invention has the advantage of being able to be thinner.

In addition, the near-infrared ray absorbing article of the present invention has the advantage of excellent mechanical properties such as strength and heat resistance.

What is claimed is:
1. A near-infrared ray absorbing article comprising:
a glass substrate;
a first light-absorbing layer having a maximum absorption wavelength in a range of 850 nm to 1,200 nm; and
a second light-absorbing layer separated from the first light-absorbing layer and having a maximum absorption wavelength in a range of 650 nm to 750 nm, and having a haze of 0.3% or less,
wherein the first light-absorbing layer is a cured product of a composition including: a first solvent, a first binder resin, and a first pigment that is dissolved in the first solvent at a concentration of 15 g/L or less at room temperature,
wherein the second light-absorbing layer is a cured product of a composition including: a second solvent, a second binder resin, and a second pigment that is dissolved in the second solvent at a concentration of more than 15 g/L at room temperature, wherein the first light-absorbing layer contains the first pigment dispersed in the first binder resin, and the second light-absorbing layer contains the second pigment coloring the second binder resin, and wherein the glass substrate has a three-point flexural strength of 360 MPa or more as measured in accordance with the ASTM D790 standard.

2. The near-infrared ray absorbing article of claim 1, wherein the first light-absorbing layer has a light transmittance of 20% or less for any one wavelength in the wavelength range of 950 nm to 1,200 nm.

3. The near-infrared ray absorbing article of claim 1, wherein the second light-absorbing layer has a light transmittance of 5% or less for any one wavelength in the wavelength range of 670 nm to 730 nm.

4. The near-infrared ray absorbing article of claim 1, having a light transmittance of 60% or more for a wavelength of 450 nm, a light transmittance of 70% or more for a wavelength of 550 nm, and a light transmittance of 40% or less for a wavelength of 1,050 nm.

5. The near-infrared ray absorbing article of claim 1, wherein a thickness of the glass substrate is in a range of 0.07 mm to 0.3 mm.

6. The near-infrared ray absorbing article of claim 1, wherein the first light-absorbing layer is provided on an opposite side of the second light-absorbing layer based on the glass substrate.

7. The near-infrared ray absorbing article of claim 1, comprising the glass substrate, the first light-absorbing layer, and the second light-absorbing layer in the order as written or the glass substrate, the second light-absorbing layer, and the first light-absorbing layer in the order as written.

8. The near-infrared ray absorbing article of claim 7, further comprising a separation layer provided between the first light-absorbing layer and the second light-absorbing layer.

9. The near-infrared ray absorbing article of claim 8, wherein the separation layer is an adhesive layer.

10. The near-infrared ray absorbing article of claim 8, wherein a thickness of the separation layer is 0.2 μm or more.

11. The near-infrared ray absorbing article of claim 1, wherein the glass substrate includes a first compressive stress layer provided on a first main surface of the glass substrate and a second compressive stress layer provided on a second main surface which is a main surface opposite the first main surface.

12. The near-infrared ray absorbing article of claim 1, wherein the first light-absorbing layer is the cured product of the composition including the first binder resin which is dissolved in the first solvent at a concentration of 100 g/L or more.

13. The near-infrared ray absorbing article of claim 1, wherein the first pigment includes a compound represented by Chemical Formula 1:

[Chemical Formula 1]

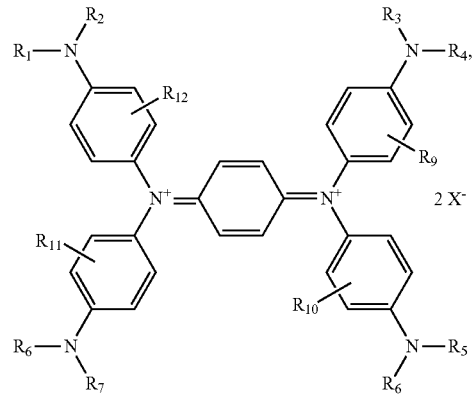

wherein, in Chemical Formula 1, $R_1$ to $R_8$ are each independently a hydrogen atom, an alkyl group, an aryl group, an aralkyl group, an alkenyl group, or an alkynyl group, $R_9$ to $R_{11}$ are each independently a hydrogen atom, a halogen group, an amino group, a cyano group, a nitro group, a carboxyl group, an alkyl group, or an alkoxy group, and X is an anion.

14. The near-infrared ray absorbing article of claim 1, wherein the second pigment includes a compound represented by Chemical Formula 2:

[Chemical Formula 2]

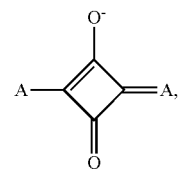

wherein, in Chemical Formula 2, A is an aminophenyl group, an indolyl methylene group, an indolinyl group, or a perimidine group, and two As centered about

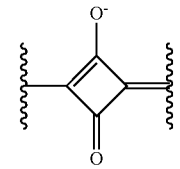

are conjugated with each other, and any one or more of hydrogens present in the aminophenyl group, indolyl methylene group, indolinyl group, or perimidine group are each independently hydrogen, a halogen group, a hydroxyl group, a cyano group, a nitro group, a carboxyl group, a C1-C20 alkyl group, a C3-C20 cycloalkyl group, a C1-C10 alkoxy group, a C7-C20 aralkyl group, a C6-C20 aryl group, a sulfonamide group, or an amide group substituted or unsubstituted with a C1-C4 alkyl group, a C1-C4 haloalkyl group, or a C7-C20 aralkyl group.

15. The near-infrared ray absorbing article of claim 14, wherein, in Chemical Formula 2, any one or more of hydrogens present in the aminophenyl group, indolyl methylene group, indolinyl group, or perimidine group are each independently substituted with a C6-C20 aryl group, and one or more hydrogens of the aryl group are additionally substituted with a C1-C4 alkyl group or a C1-C4 alkoxy group.

16. An optical filter comprising:
   the near-infrared ray absorbing article of claim 1; and
   a selective wavelength reflection layer provided on one or both surfaces of the near-infrared ray absorbing article.

\* \* \* \* \*